Aug. 9, 1955 A. L. HAMMOND 2,715,156
CHROMINANCE CHANNEL CIRCUITS
Filed Jan. 18, 1954
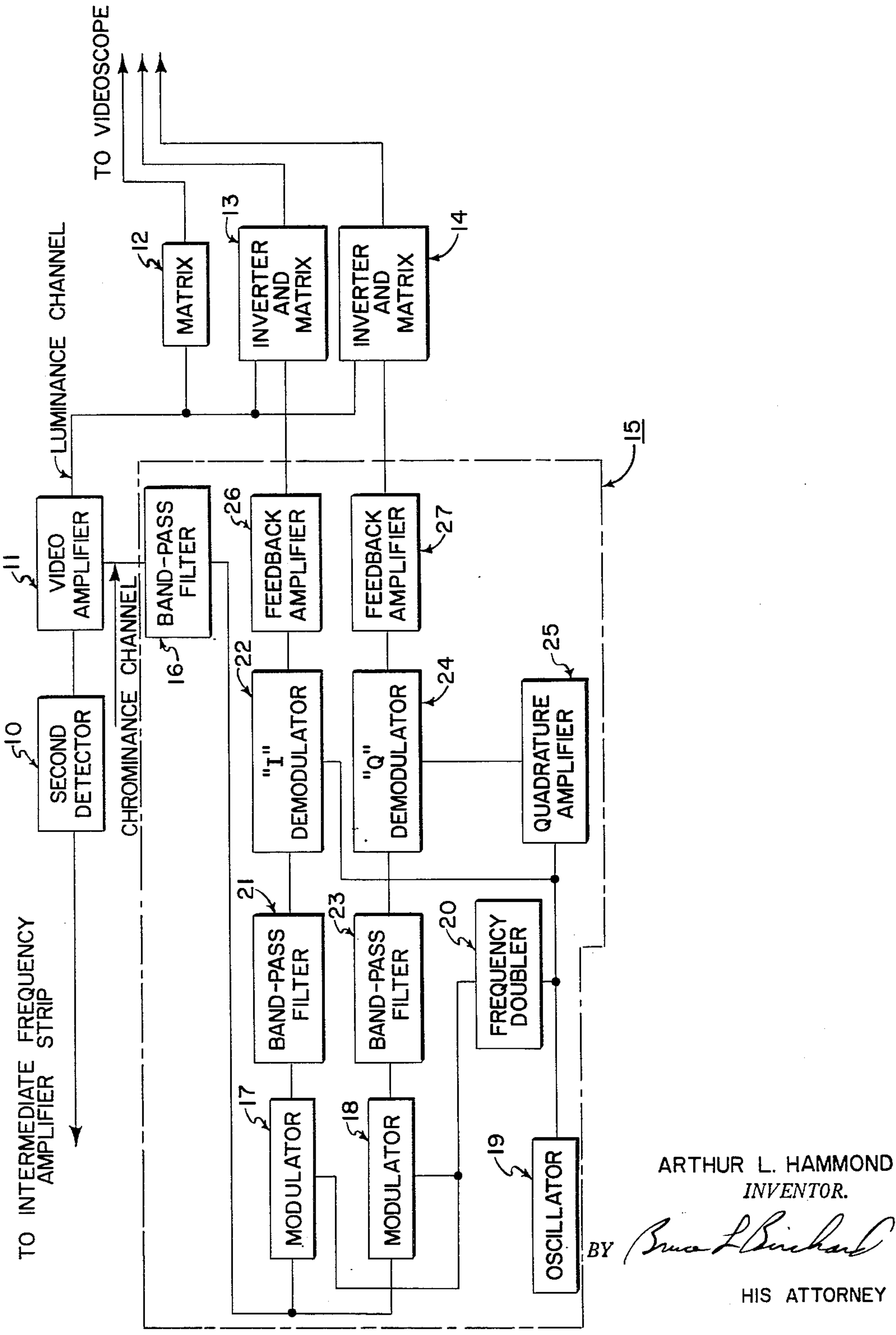
ARTHUR L. HAMMOND
*INVENTOR.*
BY [signature]
HIS ATTORNEY United States Patent Office 2,715,156

Patented Aug. 9, 1955

2,715,156

CHROMINANCE CHANNEL CIRCUITS

Arthur L. Hammond, Los Angeles, Calif., assignor to Hoffman Radio Corporation, a corporation of California Application January 18, 1954, Serial No. 404,545

4 Claims. (Cl. 178—5.4)

This invention is related to color television receiving apparatus and more particularly to an improved chrominance channel circuit for employment in such apparatus.

In the past, many attempts have been made to design a satisfactory chrominance channel circuit to detect and prepare the chrominance signals for matrixing and subsequent routing to the image reproducing device or videoscope. Invariably certain problems are encountered which render chrominance channel circuits presently in use deficient in some respect. The principal difficulty lies in the fact that the conventional band-pass filters employed in such chrominance circuits introduce unqual phase shifts in the chroma signals being received, and, indeed, a different delay or advance in phase for each separate side band frequency. This undesirable phenomenon prevents synchronization of the chroma signals with the black-and-white signals at the videoscope, and, hence, color infidelity.

Therefore, it is an object of this invention to provide an improved chrominance channel circuit for employment in color television receiving apparatus.

It is a further object of this invention to provide an improved chrominance channel circuit having means to compensate for phase shifts experienced by the chroma signals upon their passage through the chrominance channel circuit.

According to this invention the chroma subcarrier and associated sidebands are selected by a first band-pass filter and fed to two modulators to be intermodulated with a signal having a frequency at the second harmonic of the subcarrier, and the lower sideband of each of the modulator output signals is selected by a second band-pass filter, similar to the first, and fed to a feed-back amplifier which in turn is coupled to the receiver matrixing system.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing, in which:

The sole figure is a diagram of a chrominance channel circuit according to this invention.

In the subject figure, the output signal of the video intermediate frequency amplifier strip (not shown) passes through a second detector stage 10 to a video amplifier stage 11 having two output circuits. The first output circuit, constituting the luminance channel circuit, is directly connected to the inverter and matrixing circuits 12, 13, and 14; and the second output circuit is connected through chrominance channel circuit 15 to the inverter and matrixing circuits 13 and 14.

Chrominance channel circuit 15 consists of band-pass filter 16 which selectively passes the chroma subcarrier and side-bands to two modulator stages 17 and 18, to be intermodulated with the output signal from frequency doubler stage 20 which is excited by a signal at the chroma subcarrier frequency obtained from oscillator 19. The output signal of modulator stage 17 is fed through band-pass filter 21 to the "I" demodulator stage 22, to be intermodulated with the output signal of local oscillator stage 19. The output signal of modulator stage 18 is fed through band-pass filter 23 to the "Q" demodulator stage 24, to be intermodulated with the output signal of oscillator stage 19 after such signal is passed through a quadrature amplifier stage 25. Band-pass filters 21 and 23 are chosen to be identical both as to phase and frequency characteristics with band-pass filter 16 and, hence, likewise pass only the chrominance channel frequencies. The output signal from "I" demodulator stage 22 is fed through feedback amplifier stage 26, which acts as an "I" channel band-pass filter, to inverter and matrix circuit 13. The output signal from "Q" demodulator stage 24 is fed through feedback amplifier stage 27, which acts as a "Q" channel band-pass filter, to inverter and matrix circuit 14. Inverter and matrix circuits 12, 13, and 14 are subsequently coupled to the videoscope (not shown).

The circuit of the subject figure operates as follows: Band-pass filter 16 selects the chroma subcarrier and sidebands for passage through chrominance channel circuit 15.

A particular sideband frequency present in the chrominance channel output signal of video amplifier stage 11 may be represented by the equation:

$$E_s = A_s \cos wt \quad (1)$$

where $E_s$ is the particular sideband frequency signal, $A_s$ is the maximum signal amplitude, $w$ is two-pi times the signal frequency, and $t$ equals time. As this signal $E_s$ is impressed upon and passed through band-pass filter 16 it will experience a certain phase shift, owing to the properties of filter 16. Filter 16 may be so designed that the chroma subcarrier, itself, will experience no change in phase while passing through it. However, frequencies of the lower sideband will experience a phase advance with respect to the subcarrier, and frequencies of the upper sideband will experience a phase delay with respect to the subcarrier. Selecting a particular lower sideband signal $E_1$, it will be found that $E_1$ will have advanced in phase by an angle $\theta$ by virtue of its passing through filter 16.

Then, $$E_1 = A_1 \cos (wt + \theta) \quad (2)$$

where $A_1$ is the maximum amplitude of $E_1$. This phase shift of $\theta$ will disturb synchronization of the chroma signals with the monochrome signals of the luminance channel at the videoscope. Hence, it is desirable to correct this phase error.

The effect when sideband signal $E_1$ is intermodulated with a harmonic of the subcarrier, designating the particular order of harmonic by K, i. e., K equals 1 for the first harmonic (fundamental), K equals 2 for the second harmonic (twice the fundamental frequency), etc., should now be studied. The heterodyning harmonic signal may be designated as $E_2$, and $$E_2 = A_2 \cos Kwt \quad (3)$$

where $A_2$ is the maximum amplitude, $w$ is two-pi times the subcarrier frequency, and $t$ again is time. It is recalled that amplitude modulation is produced through varying the amplitude of the wave to be modulated, the deviation of the amplitude from the unmodulated value being directly proportional to the instantaneous value of the modulating wave but independent of its frequency.

In accordance with this definition, the amplitude of the modulated wave is a function of time given by $$(4) \qquad A(t)=A_1+k_aA_2 \cos (wt+\theta)$$

where $k_a$ is a constant of proportionality; hence the output heterodyned signal may be defined $$E_0=A(t) \cos Kwt$$

and from (4)

$$E_0=(A_1+k_aA_2 \cos (wt+\theta)) \cos Kwt$$

or $$(5) \qquad E_0=A_1(1+m \cos (wt+\theta)) \cos Kwt$$

where $m$, the modulation factor, equals $$\frac{k_aA_2}{A_1}$$

But from elementary trigonometry we have the identity $$(6) \qquad \cos x \cos y=\tfrac{1}{2} \cos (x+y)+\tfrac{1}{2} \cos (x-y)$$

and hence, from Equations 5 and 6

(7)

$$E_0=A_1 \cos Kwt+A_1+\frac{m}{2} \cos ((K+1)wt+\theta)+ A_1\frac{m}{2} \cos ((K-1wt-\theta)$$

which is to say $E_0$=a carrier+an upper sideband+a lower sideband

By letting K equal 2, i. e., by using as a heterodyning signal the output of stage 20 which is at double the chrominance subcarrier frequency, and selecting the lower sideband it is found that this lower sideband signal corresponds to the original sideband signal of Equation 2 with the exception that the new sideband signal lags the original chroma subcarrier by an angle $\theta$. Thus, by employing band-pass filters 21 and 23, which are duplicates of band-pass filter 16, we find that while the original lower sideband signals ($A \cos wt$) experiences a phase advance of $\theta$ upon passage through chrominance band-pass filter 16, this resultant signal ($A \cos (wt+\theta)$) will experience a phase delay of $2\theta$ when passing through each of the two modulator stages 17 and 18 (see the third term of Equation 7), and a subsequent phase advance of $\theta$ upon passage through phase compensating band-pass filters 21 and 23; hence, restoration to the phase of the original side-band signal is finally achieved.

It is accordingly seen that all frequencies constituting the upper and lower sidebands of the chroma subcarrier will be restored in phase to their original relationships by virtue of the phase-shift compensating feature of the chrominance channel according to this invention.

Of course, any harmonic of the chroma subcarrier may be employed by using the appropriate frequency multiplier for stage 20. But then a frequency multiplier must also be inserted between the local oscillator and the "I" and "Q" demodulators, this latter frequency multiplier having an order of multiplication equal to $K-1$, where K is the multiplication factor of frequency multiplier stage 20.

Absence of phase shifts in the chroma signals is further assured by the employment of feedback amplifier stages 26 and 27, instead of the conventional low-pass filters, to limit the "I" and "Q" channels to the desired bandwidths. Feedback amplifiers are characterized by no time delay and very constant phase relations over a band of frequencies, whereas low-pass filters are characterized by a phase or time delay of approximately one microsecond at the frequencies used in the chrominance channel, thus requiring a compensating one microsecond delay line in the luminance channel. This requirement is thus avoided by use of feedback amplifiers.

From the foregoing description of the present invention, it is seen that there has been provided for use in color television receivers a new and useful chrominance channel circuit which reduces to a minimum phase distortion of chroma signals occurring in the chrominance channel, and consequently improves the overall synchronization of the color impulses with the brightness impulses at the videoscope.

While this invention has been described in terms of color television receiving apparatus, this invention may also be applicable in other instances where it is desired to retain certain phase relationships.

While particular embodiments of the present invention have been shown and described, it will be obvious to those skilled in the art that changes and modifications may be made without departing from this invention in its broader aspects, and therefore, the aim in the appended claims is to cover all such changes and modifications as fall within the true spirit and scope of this invention.

I claim:

1. A phase restorer circuit for employment in the I and Q demodulator branches of the chrominance channel of a color television receiver to restore the phase relationships between the chroma sidebands and the chroma subcarrier to those existing immediately prior to the selection of such sidebands and carrier by a chrominance channel selective filter, said phase restorer circuit including, in combination, a modulator stage having two input terminals and an output terminal, a phase restorer filter having sideband phase shift characteristics corresponding to those of said chrominance channel selective filter, a local oscillator, and a frequency multiplier, said local oscillator being coupled through said frequency multiplier to one of said input terminals of said modulator, the remaining input terminal of said modulator being adapted for coupling to said chrominance channel selective filter, and said phase restorer filter being coupled to said output terminal of said modulator.

2. A phase compensating band-pass filter circuit for employment in the chrominance channel of a color television receiver including, in combination, a first band-pass filter, a first modulator having a first input circuit, a second input circuit, and an output circuit, and a second modulator having a first input circuit, a second input circuit, and an output circuit, said first band-pass filter being coupled to said first input circuit of said first modulator and to said first input circuit of said second modulator; a local oscillator and a frequency multiplier, said local oscillator being coupled through said frequency multiplier to said second input circuit of said first modulator and to said second input circuit of said second modulator; a second band-pass filter and a third band-pass filter each having sideband phase shift characteristics corresponding to said first band-pass filter, said output circuit of said first modulator being coupled to said band-pass filter, and said output circuit of said second modulator being coupled to said third band-pass filter.

3. A chrominance channel circuit for employment in color television receivers and comprising, in combination, a first band-pass filter, a first modulator stage having a first input circuit, a second input circuit, and an output circuit, and a second modulator stage having a first input circuit, a second input circuit, and an output circuit, said first band-pass filter being connected to said first input circuit of said first modulator stage and to said first input circuit of said second modulator stage; a local oscillator stage and a frequency doubler stage, said local oscillator stage being connected through said frequency doubler stage to said second input circuit of said first modulator stage and to said second input circuit of said second modulator stage; a second band-pass filter having characteristics corresponding to said first band-pass filter and an "I" demodulator stage having a first input circuit, a second input circuit, and an output circuit, said output circuit of said first modulator stage being connected through said second band-pass filter to said first input circuit of said "I" demodulator stage, and said local oscillator stage being connected to said second input circuit of said "I" demodulator stage; a third band-pass filter having characteristics corresponding to said first band-pass filter, a "Q" demodulator stage having a first input circuit, a second input circuit, and an output circuit, and a quadrature amplifier stage, said local oscillator stage being connected through said quadrature amplifier stage to said second input circuit of said "Q" demodulator stage; a first feed-back amplifier stage, and a second feed-back amplifier stage, said output circuit of said "I" demodulator stage being connected to said first feed-back amplifier stage, and said output circuit of said "Q" demodulator stage being connected to said second feed-back amplifier stage.

4. A chrominance channel circuit for employment in color television receivers and comprising, in combination, a first band-pass filter, a first modulator stage having a first input circuit, a second input circuit, and an output circuit, and a second modulator stage having a first input circuit, a second input circuit, and an output circuit, said first band-pass filter being connected to said first input circuit of said first modulator stage and to said first input circuit of said second modulator stage; a local oscillator stage and a first frequency multiplier stage, said local oscillator stage being connected through said first frequency multiplier stage to said second input circuit of said first modulator stage and to said second input circuit of said second modulator stage; a second frequency multiplier stage, a second band-pass filter having characteristics corresponding to said first band-pass filter, and an "I" demodulator stage having a first input circuit, a second input circuit, and an output circuit, said output circuit of said first modulator stage being connected through said second band-pass filter to said first input circuit of said "I" demodulator stage, and said local oscillator stage being connected through said second frequency multiplier stage to said second input circuit of said "I" demodulator stage; a third band-pass filter having characteristics corresponding to said first band-pass filter, a "Q" demodulator stage having a first input circuit, a second input circuit, and an output circuit, and a quadrature amplifier stage, said local oscillator stage being connected through said second frequency multiplier stage and said quadrature amplifier stage to said second input circuit of said "Q" demodulator stage; a first feed-back amplifier stage, and a second feed-back amplifier stage, said output circuit of said "I" demodulator stage being connected to said first feed-back amplifier stage, and said output circuit of said "Q" demodulator stage being connected to said second feed-back amplifier stage.

References Cited in the file of this patent

UNITED STATES PATENTS

| | | |
|---|---|---|
| 2,667,534 | Creamer | Jan. 26, 1954 |
| 2,668,189 | Reddeck | Feb. 2, 1954 |
| 2,674,651 | Creamer | Apr. 6, 1954 |